Figure 2:
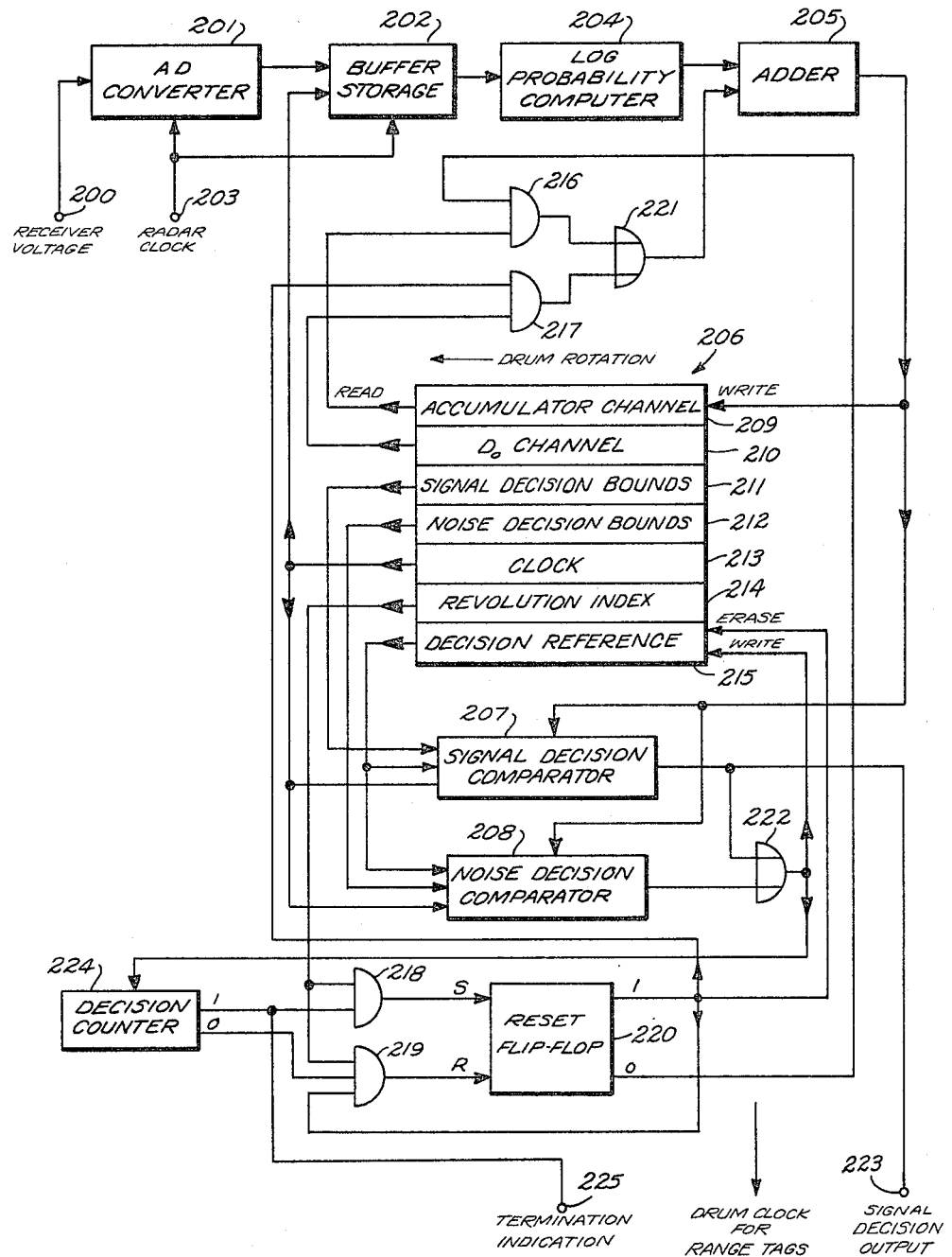

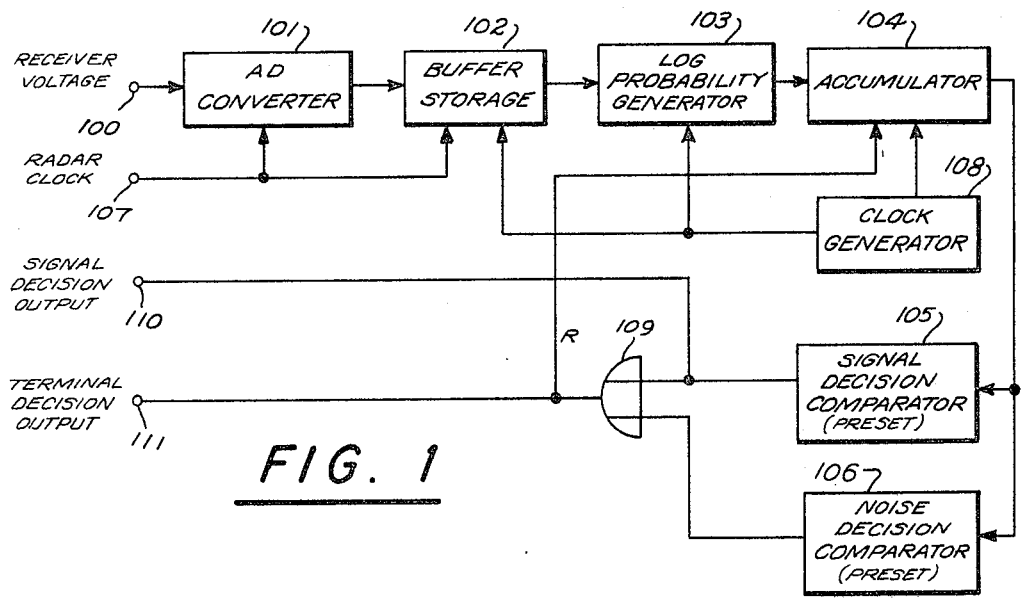
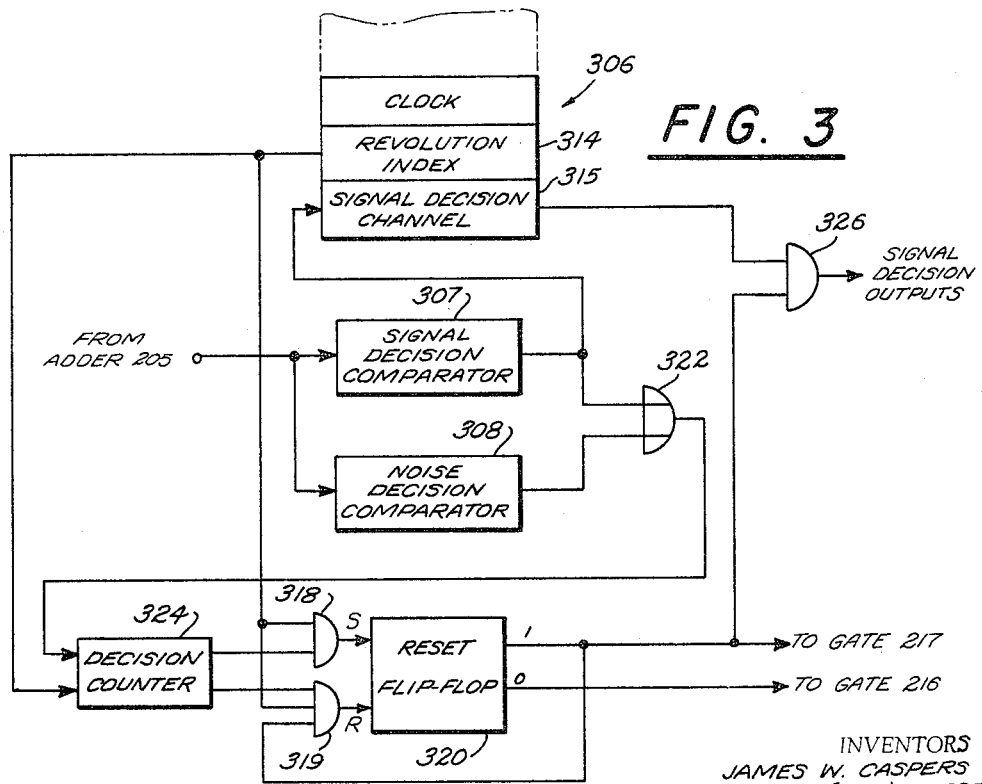

INVENTORS
JAMES W. CASPERS
CARLOS (NMI) NUESE
BY
ATTORNEYS

United States Patent Office 3,281,834
Patented Oct. 25, 1966

3,281,834
GENERAL DIGITAL SEQUENTIAL DETECTOR
James W. Caspers and Carlos Nuese, San Diego, Calif., assignors to the United States of America as represented by the Secretary of the Navy
Filed Feb. 24, 1964, Ser. No. 347,095
6 Claims. (Cl. 343—5)

The invention described herein may be manufactured and used by or for the Government of the United States of America for governmental purposes without the payment of any royalties thereon or therefor.

The present invention relates to a sequential signal detector and more particularly to a multilevel digital sequential detector.

The present invention represents an extension and modification of U.S. Patent 3,145,379, titled Sequential Signal Detector, which issued August 18, 1964, and U.S. Patent 3,171,119, titled Binomial Sequential Detector, and issued February 23, 1965. The binomial sequential detector relates to a sequential signal detector where the input is converted to "ones" and "zeroes" by a quantizer. The sequential detection process is then simply that derived from the sequential probability ratio test on the binomial distribution. The main reason for the conversion to a binomial form is simplification over that indicated in copending application No. 58,855, now U.S. Patent 3,145,-379, relating to the sequential signal detector. The simplification results in approximately a 50% increase in sample size for detection time over the optimum.

An object of the present invention is to provide a practical general digital sequential detector.

Another object of the present invention is to provide a multilevel digital sequential detector.

A further object of the present invention is to provide a digital sequential detector which increases the effective range of a radar system.

Other objects and many of the attendant advantages of this invention will be readily appreciated as the same becomes better understood by reference to the following detailed description when considered in connection with the accompanying drawings wherein:

FIG. 1 is a block diagram for a single detector;
FIG. 2 is a block diagram illustrating the use of parallel detectors for radar applications;
FIG. 3 is a block diagram of a digital sequential detector bank using forced continuation test techniques.

The extension and modification of the foregoing sequential detector and binomial sequential detector, previously referred to, relates to a system which quantizes into an arbitrary number of levels. When this is properly done the performance characteristics of the system fall between the optimum and the binomial case.

FIG. 1 illustrates the general block diagram for a single detector. A radar receiver voltage in analog form is coupled in at an input 100 to an analog-to-digital converter 101. The output of the analog-to-digital converter 101 is connected to a buffer storage unit 102 and coupled from the buffer storage unit 102, in digital form, to a logarithm probability generator or computer 103. The output of the logarithm probability generator 103 is coupled into an accumulator 104 which is in reality some type of conventional adder, which keeps a running sum. The output of the accumulator 104 is then coupled to a signal decision comparator 105 and a noise decision comparator 106. The A-to-D converter 101 and buffer storage 102 also have an input from a radar clock coupled in on input 106. In addition, the buffer storage 102 and the logarithm probability computer 103 and accumulator 104 have an input from a clock generator 108.

The signal decision comparator 105 and noise decision comparator 106 each have single outputs which are coupled as inputs to an OR gate 109. In addition, the output from the comparator 105 is also coupled out to an output terminal 110 as the signal decision output for the system. The output from OR gate 109 is coupled to an output terminal 111 as the terminal decision output for radar antenna control and also coupled as the reset command to the accumulator 104.

The analog-to-digital converter 101 converts the input analog voltage to a digital form to any desired base, usually base 2 or base 10. The base 2 mode, for example, would correspond to a binary representation of the input voltage represented by as many binary bits as desired.

The logarithm probability computer 103 computes the term associated with the logarithm of the probability ratio of the analog-to-digital converter output. This term is represented by small z and takes various forms as will be discussed later.

The accumulator performs two functions, i.e., computing and storing. The accumulator 104 is first reset to zero or some arbitrary state by the reset output from OR gate 109. The accumulator then computes and stores input, that is, at the $i$th sample point the storage sum is $D_0 + Z_1 + Z_2 \ldots + Z_i$ where $D_0$ may or may not be zero.

The stored sum is compared at each sample point with two present levels, one in the signal decision comparator 105 and one in the noise decision comparator 106. Whenever the stored sum in the accumulator 104 is equal to or greater than the signal decision comparator level a signal decision results. When the stored sum is equal to or less than the noise decision comparator level a noise decision results at the output of the comparator 106. Either of the two events, i.e., a signal decision or a noise decision, resets the accumulator through OR gate 109 to the starting condition and the equipment is ready for a new test or detection process.

A "clock" control is utilized for coordinating the various operations. Whether this clock is used as depicted depends upon the exact nature of the digital equipment involved. Its only purpose is to show diagrammatically the coordinated actions of convert, compute, add and compare.

The digital operations depicted in the block diagram of FIG. 1 can be implemented by any of the standard methods in use. There are no restrictions regarding vacuum tubes, semiconductor devices, shift registers or delay lines of either the circulating or non-circulating type. The mode of implementation will be decided by operational requirements and the design engineer.

The exact computations performed by the present sequential detector depend upon the input's statistical characteristics. In any event, these are derived from the theory of the sequential probability ratio test set forth in Wald, Sequential Analysis, published by Wiley in 1947. In the case of the Rayleigh distribution situation the components of the block diagram of FIG. 1 perform as follows.

The analog-to-digital converter 101 converts the radar receiver output at input 100 into digital form. Let $x_i$ be the output of the receiver the $i$th clock or $i$th stage of the computation. The logarithm probability computer computes $z_i$ where $$Z_i = \left(\frac{1}{\theta_0} - \frac{1}{\theta_1}\right) x_i^2 - \ln\frac{\theta_1}{\theta_0} \qquad (1)$$

where $\theta$ is a parameter and wherein the parameter $\theta$ may take any value permitted by the form of the density function, including the discrete values of $\theta_0$ and $\theta_1$. Also, in the instant case $D_0 = 0$.

The accumulator 104 has at any stage $i$, provided the detection process has not terminated, the sum $$\sum_{J=1}^{i} Z_J$$

The signal decision comparator is set to the number ln $A$. If at any stage $$i\sum_{J=1}^{i} Z_J \leq \ln A$$

a signal decision results.

The noise decision comparator 106 is set to the number ln $B$, a negative number, and if at any stage $$i\sum_{J=1}^{i} Z_J \leq \ln B$$

a noise decision results. Through algebraic manipulation the inequality formula $$\ln B \leq \sum_{J=1}^{i}\left[\left(\frac{1}{\theta_0} - \frac{1}{\theta_1}\right)x_i^2 - \ln \frac{\theta_1}{\theta_0}\right] \leq \ln A \quad (2)$$

may be arranged into $$\frac{\ln B}{1/\theta_0 - \frac{1}{\theta_1}} \leq \sum_{J=1}^{i}\left(x_i^2 - \frac{\ln \theta_1/\theta_0}{1/\theta_0 - 1/\theta_1}\right) \leq \frac{\ln A}{1/\theta_0 - \frac{1}{\theta_1}} \quad (3)$$

Then for the logarithm probability computer 103

$$Z_i = x_i^2 \frac{\ln \theta_1/\theta_0}{-1/\theta_0 - 1/\theta_1} \quad (4)$$

Again, note that $D_0=0$. This avoids any multiplication except for the squaring operation on $x$.

The signal decision comparator 105 and the noise decision comparator 106 are set to $$\frac{\ln A}{1/\theta_0 - 1/\theta_1} \text{ and } \frac{\ln B}{1/\theta_0 - 1/\theta_1}$$

respectively.

The basic inequality may be written in another form by substracting logarithm $B$ from the basic inequality; thus $$0 \leq \sum_{J=1}^{i}\left[\left(\frac{1}{\theta_0} - \frac{1}{\theta_1}\right)x_i^2 - \ln \frac{\theta_1}{\theta_0}\right] - \ln B \leq \ln A - \ln B \quad (5)$$

then $$Z_i = \left(\frac{1}{\theta_0} - \frac{1}{\theta_1}\right)x_i^2 - \ln \frac{\theta_1}{\theta_0}, \ D_0 = -\ln B \quad (6)$$

and the comparator levels for the signal decision comparator 105 and the noise decision comparator 106 will be set at ln $A$ — ln $B$ or ln $A/B$ and zero respectively.

A further alternative results by noting that $A$ is greater than $B$ and hence ln $A$ — ln $B$ is positive. Thus, upon dividing through by ln $A$ — ln $B$ one obtains $$0 \leq \frac{\sum\left[\left(\frac{1}{\theta_0} - \frac{1}{\theta_1}\right)x_i^2 - \ln \frac{\theta_1}{\theta_1}\right] - \ln B}{\ln A - \ln B} \leq 1 \quad (7)$$

This yields $$Z_i = \left[\frac{1}{\theta_0 - \frac{1}{\theta_1}} x_i^2 - \ln \frac{\theta_1}{\theta_0}\right] / \ln \frac{A}{B}$$

with the initial term $$D_0 = \frac{-\ln B}{\ln (A/B)}$$

and the signal decision comparator 105 and noise decision comparator 106 set at 1 and 0 respectively.

The above alternatives are all equivalent from the operational point of view, however.

Another interesting case is that of Gaussian statistics. In this example, $$\frac{S}{N} = \left(^1\mu_1'\right)^2$$

and $$N = (^0\mu_2')$$

where S is signal power, N is noise power, $^1\mu_1'$ is the mean level of the receiver output in the presence of a signal and $^0\mu_1'$ is the second moment about zero of the receiver output voltage when only noise is present. In the noise case the mean of the receiver output $^0\mu_1'=0$ and the standard deviation is taken as one for all situations. Now, $$\ln\left[\frac{\frac{1}{\sqrt{2\pi e}} - \frac{1}{2}(x_i - \mu)^2}{\frac{1}{\sqrt{2\pi e}} - \frac{1}{2}x_i^2}\right] = \mu x_i - \tfrac{1}{2}\mu^2 = \frac{S}{N}x_i - \tfrac{1}{2}\frac{S}{N} \quad (8)$$

where $\mu = ^1\mu_1'$ for notational purposes. Thus, the logarithm probability computer 103 computes $$Z_i = \sqrt{\frac{S}{N}} x_i - \frac{1}{2}\frac{S}{N}$$

and the other components of the block diagram operate as before. Ln $A$ and ln $B$ are determined as previously set forth in Wald's theory. In this case $D_0 = 0$.

An alternative result from the basic relations:

$$\ln B \leq \sum_{J=1}^{i}\left(\sqrt{\frac{S}{N}}x_j - \frac{1}{2}\frac{S}{N}\right) \leq \ln A \quad (9)$$

$$\ln B \leq \sqrt{\frac{S}{N}}\sum_{J=1}^{i}\left(x_j - \sqrt{\frac{S}{N}}\right) \leq \ln A \quad (10)$$

$$\sqrt{\frac{N}{S}}\ln B \leq \sum_{J=1}^{i}\left(x_j - \sqrt{\frac{S}{N}}\right) \leq \sqrt{\frac{N}{S}}\ln A \quad (11)$$

where now the logarithm probability computer computes $$Z_i = x_i - \sqrt{\frac{S}{N}}$$

and the signal decision comparator 105 and noise decision comparator 106 are set at $$\sqrt{\frac{N}{S}}\ln A \text{ and } \sqrt{\frac{N}{S}}\ln B$$

respectively.

Two more alternates are again available where the logarithm probability computer 103 computes $$Z_i = \sqrt{\frac{S}{N}} x_i - \frac{1}{2}\frac{S}{N}$$

the signal decision comparator 105 is set to ln $A$ — ln $B$ or $$\ln \frac{A}{B}$$

and the noise decision comparator 106 set to 0 where $D_0 = \ln B$ or: the computer computes $$Z_i = \frac{\sqrt{\frac{S}{N}} x_i - \frac{1}{2}\frac{S}{N}}{\ln A - \ln B}$$

where $$D_0 = \frac{-\ln B}{\ln A - \ln B}$$

and the signal and noise decision levels are 1 and 0 respectively.

FIG. 2 illustrates a system for using parallel detectors for radar applications. A radar receiver voltage is coupled in an input 200 to an analog-to-digital converter 201 and then to a buffer storage unit 202. A radar clock is also coupled in at 203 as an input to the analog-to-digital converter 201 and the buffer storage 202. The output of the buffer storage is coupled as an input to a logarithm probability computer 204 and the output of the computer is coupled as one input to an adder 205. The output of adder 205 is coupled as an input to the write heads, not shown, associated with a magnetic drum 206. The same output from the accumulator 205 is also coupled as an input to a signal decision comparator 207 and a noise decision comparator 208. In the illustration the drum 206 is shown to have seven channels, and accumulator channel 209, a $D_0$ channel 210, a signal decision bound channel 211, a noise decision bound channel 212, a clock channel 213, a revolution index channel 214 and a decision reference channel 215. Each of the channels has a write head and a read head associated with it, however, these are not shown for the purposes of simplicity in the illustration.

The output from the read head associated with the accumulator channel 209 is coupled as one input to an AND gate 216; the output from the $D_0$ channel read head is coupled as one input to an AND gate 217; the output from the read head associated with the signal decision bound channel 211 is coupled as one input to the signal decision comparator 207; the output from the read head associated with the noise decision bound channel 212 is coupled as one input to the noise decision comparator 208; the output from the read head associated with the revolution index channel 214 is coupled as an input to AND gate 218 and AND gate 219; while the output from the read head associated with the decision reference channel 215 is coupled as another input to the signal decision comparator 207 and the noise decision comparator 208.

The output from the read head associated with the clock channel 213 is coupled as another input to the buffer storage unit 202, as another input to the signal decision comparator 207 and the noise decision comparator 208.

A flip-flop 220 having a set input and a reset input and a one output and a zero line is utilized to provide reset and erase pulses for some of the associated circuitry. The output on the one line is coupled as another input to AND gate 217, another input to AND gate 219 and also coupled to the erase head associated with the decision reference channel 215. The zero output from the flip-flop 220 is coupled as the other input to AND gate 216. The outputs from AND gates 216 and 217 are coupled through an OR gate 221 as another input to adder 205.

The output from the signal decision comparator 207 is coupled as one input to an OR gate 222 and also coupled to output 223 as a signal decision output. The output from the noise decision comparator 208 is also coupled to OR gate 222. The output from the OR gate 222 is coupled to a decision counter 224 and as the write input to decision reference channel 215.

Decision counter 224 is preset to indicate whenever a decision count equal to the number of parallel detectors is reached. Decision counter 224 has two outputs corresponding to a one and zero. The one output is coupled as another input to AND gate 218 and also coupled to output terminal 225 as a termination indication for the radar equipments. The zero output from the decision counter 224 is coupled as another input to AND gate 219. The output from AND gate 218 corresponds to the set input for flip-flop 220 while the output from AND gate 219 corresponds to the reset input to the same flip-flop.

In the operation of the system of FIG. 2 the receiver voltage from an associated radar receiver is coupled from input 200 to the analog-to-digital converter 201. A radar clock pulse is also supplied at input 203, there being a clock pulse for each radar range bin used in the detection process. The clock pulses start at the minimum range and conclude at the maximum range, once for each radar sweep and will usually not occupy the entire radar interpulse period because of radar recovery characteristics.

Thus, for example, for a range resolution of one mile, with a minimum range of 100 miles and a maximum range of 300 miles, a burst of 200 clock pulses in each interpulse period would be used.

The radar receiver voltages are converted into digital form by the analog to digital converter 201 and read into the buffer storage unit 202. The buffer storage 202 holds this data, one sweep, until read out by the clock from the clock channel 213 on magnetic drum 206. Read-in and read-out of the buffer storage 202 can occur concurrently, the $n+1$th sweep being read in while the $n$th sweep is being read out.

Data sweep or burst held in the buffer storage 202 is interpreted as a vector having, in this example, 200 components by the pulses from the drum clock channel 213 into the log probability computer 204 which converts the vector into another vector where each components is $Z_{ji}, j=1, 2, \ldots, 200$ (for this example) $i=1, 2, \ldots$ as dictated by the underlying test described in connection with FIG. 1. The $\overline{Z}$ sequence goes to the adder 205 where the first $\overline{Z}$ is added to $\overline{D}_0$ where $\overline{Z}$ and $\overline{D}$ are vectors. There is at this first action one $z$ and one $D_0$ for each detector or range bin, ($D_0$ and Z are not necessarily the same for all components). For each following action $\overline{Z}_j$ is added to the vector stored in the accumulator channel 209 of the magnetic drum 206.

The magnetic drum, as before stated, has seven channels in the illustration. The top four of these may have one or several tracks depending upon whether serial or parallel recording and readout are used. For each component of the stored vector, one of the channels is the accumulator channel 209 which stores the accumulated value, one value on vector component for each range bin. In the example, 200 values are stored. If a 3 bit representation were used then the accumulator channel would store 600 information bits, either all on one track for serial operation or 200 each on three tracks for parallel operation.

Also on the drum 206 is the $D_0$ channel which stores some value of $D_0$ for each of the range bins, again in the example 200. The $D_0$ value need not be the same for all range bins and agian either serial or parallel operation may be used for each $D_0$ component.

The signal decision bound channel 211 stores a vector of signal decision bounds, one for each range bin. These need not all be the same. Again, either serial or parallel recording and read-out may be used for each bound of which there are 200.

The noise decision bound channel 212 functions in a manner analogous to the signal decision bound channel 211.

The clock channel 213 stores a sequence of clock pulses, in the present example, 200.

The revolution index channel 214 stores one pulse which gives an indication that one drum revolution has been completed and a new one is starting.

The final channel corresponds to a decision reference channel 215 which will be explained subsequently.

The $D_0$, signal decision bound channel 211, noise decision bound channel 212, clock channel 213 and revolution index chanel 214 are normally pre-recorded. These remained fixed until such time as a re-programming of the sequential detectors is desired. If such re-programming is anticipated, read-heads and auxiliary equipment would be provide for this purpose. However, in the present example this is not shown.

For the purposes of illustration, suppose the detection process is just completed, i.e., all detector decisions for all range bins have been reached. At this time the decision counter has reached 200 in the present example and a "one" is sent out on the one line from decision counter 224 to AND gate 218. When a revolution index from channel 214 on the drum 206 appears at AND gate 218 simultaneously a pulse is coupled in to the set line of flip-flop 220 and the flip-flop is set. This supplies a "one" to one leg of AND gate 217 and a "zero" to one leg of AND gate 216. Thus, the OR gate 221 has a zero input on one leg from AND gate 216 and the output from the $D_0$ channel through AND gate 217. At this time the $D_0$ vector will be read into adder 205.

At each clock pulse, the adder 205 has a value for a z component on the input line from the log probability generator 204. The output of the adder 205 thus corresponds to a sequence of terms forming a vector, each term being of the form $D_0+z$, there being one of these sums for each range bin. At the completion of one revolution of the magnetic drum 206 the next revolution index appears.

During this period the flip-flop 220 is set and thus a "one" has been held at one input of AND gate 219 from the flip-flop 220. The revolution index which is also applied to AND gate 219 causes the AND gate output to go to a "one" which resets the flip-flop provided the decision counter has not again reached a count of 200 in the illustrated case. When flip-flop 220 is reset AND gate 217 is turned off and AND gate 216 is turned on. The reason for the negation line from decision counter 224 to AND gate 219 will be explained later. Thus, during the next revolution of the drum 206 the vector in the accumulator channel 209, a $D_0+z$ component for each range bin is added bin by bin or component by component to the output of the log probability computer 204. For each range bin there will be the sum of $D_0$ and two successive outputs from the log probability generator 204 and this process repeats for as long as the flip-flop 220 is in the "zero" state.

The output of the adder 205 is also coupled to both the signal decision comparator 207 and the noise decision comparator 208. The comparators each have another input, the signal decision comparator 207 having the output vector from the signal decision bound channel 211 coupled in and the noise decision comparator 208 having the output from the noise decision bound channel 212 coupled in. In each case, in the present example, the vector consists of 200 digital numbers which may or may not be the same. Either parallel or serial mode may be used.

The signal decision comparator 207 compares the sum stored on the accumulator channel 209, range bin by range bin, with the corresponding signal decision bound from the signal decision bound channel 211. If at any range bin the output of the accumulator channel 209 is equal to or exceeds the corresponding signal decision bound from channel 211 a signal output is indicated at the output of the signal decision comparator. The output occurs in synchronism with the drum clock and hence an identification with range bin is had. The decision output from the signal decision comparator 207, besides being coupled to output terminal 223, is also coupled to one leg of OR gate 222.

The output of OR gate 222 is coupled to the decision counter 224 and a count is registered for each signal decision. The output from gate 222 also is coupled to the write head, not shown, on the decision reference channel 215 such that a decision indication is placed on the decision reference channel corresponding to the range bin for which the signal decision was made. The decision reference pulse thereafter, until it is erased, inhibits any further decisions for that particular range for either signal or noise.

The noise decision comparator 208 functions in an analogous manner to signal decision comparator 207, the output from the comparator 208 also being coupled to OR gate 222. Thus, for any noise decision at any range bin a decision reference pulse is placed on the decision reference track 215 and a decision output is presented and counted by the decision counter 224.

When a decision has been reached for each range bin, 200 in this example, the decision counter 224 output sets one leg of AND gate 218 at one.

At this time, the flip-flop 220 is in the "zero" state and AND gate 219 is turned off. Thus, the output from the revolution index channel 214 when applied to AND gate 218 sets the flip-flop 220 to a "one" state. The assertion output of the flip-flop 220 is applied to the erase head of decision reference channel 215 to erase the reference such that a new test may start. The assertion output of the decision counter is also brought out externally for control purposes on the output terminal 225. In radar applications, for example, the termination indication is used to step the radar antenna beam to the next position.

The negation output of the decision counter 224 is applied as one input to AND gate 219. If a decision had been obtained for every range bin on the first revolution of the drum then the decision counter should be at 200. Thus, the negation output is at "zero" and this prevents the next output from the revolution index 214 from resetting the flip-flop 220. In other words if the test should terminate on the first drum revolution a new test should start on the next rotation and the $D_0$ terms should be sent to the adder 205.

The buffer storage 202 is used whenever data bursts from the analog-to-digital converter 201 occur at a high rate for a part of the radar interpulse interval and the remaining part is desired for data processing in the digital sequence detector. If data rate and processing rate are comparable at all times then the buffer storage 202 could be deleted.

The log probability computer 204 converts the input digital data into z in digital form. When z takes on few values these values may be held in storage on the magnetic drum or by some other means. In some cases, such as normal statistics with a test on the mean, the log probability generator 204 is not required since its input and output may be the same and the decision bounds modified accordingly. In this case, the signal and noise decision bounds would be modified by programming an increase of ½ S/N on the bound $$\frac{\ln A}{\sqrt{S/N}}$$

and $$\frac{\ln B}{\sqrt{S/N}}$$

for each data burst; these terms are vectors.

The decision counter 224 may be mod 200 counter in this example. If such is the case, then a reset of the counter is not required in that it will recycle automatically at the end of the 200 count.

The digital sequential detector is readily converted to forced continuation tests as set forth in co-pending application Serial No. 144,519, filed October 11, 1961, now U.S. Patent 3,153,231. This is shown in block diagram form in FIG. 3. In order to do this one would delete the decision reference channel 215 of FIG. 2 on the magnetic drum 306. In place of the decision reference channel, a new channel, a signal decision channel 315 is provided. The input to the new channel 315 is the output of the signal decision comparator 307.

In the embodiment of FIG. 3 a magnetic drum 306 is again provided wherein the signal reference channel 215 of FIG. 2 has been replaced by a signal decision channel 315. The signal decision channel derives its input from a signal decision comparator 307. Again, a noise decision comparator 308 is provided, a decision counter 324, and AND gates 318 and 319 and a flip-flop 320. The outputs from the signal decision comparator and the noise decision comparator are again coupled through an OR gate, in this case OR gate 322 as an input to the decision counter 324. In the example of FIG. 3 the output from the signal decision channel 315 is coupled as one input to an AND gate 326. The other input to AND gate 326 corresponds to the "one" output of the flip-flop 320. Also, in the example of FIG. 2 an output from the revolution index channel 314 is coupled as an input to the decision counter 324.

In the example of FIG. 3 the 300 series is used and in all places where the 300's are used they correspond to the analogous block in FIG. 2 such as 307 corresponds to 207, 308 corresponds to 208, etc.

During one rotation of the drum 306 a "one" appears at the output of OR gate 322 for each decision whether made by the signal decision comparator 307 or noise decision comparator 308. The decisions are counted by the decision counter 324 which is reset at the end of each revolution of the magnet drum 306 by the output from the revolution index channel 314.

For the purposes of illustration, let it be supposed that during any given revolution for each range bin either the signal decision comparator or the noise decision comparator yields a "one" output. This would correspond to a decision by either the signal decision comparator 307 or the noise decision comparator 308. The decision counter 324 reaches the preset value, 200 in the present example, and the flip-flop 320 receives a reset pulse which resets it as explained with regard to FIG. 2. While $D_0$ terms are being read into the adder during the next drum revolution the signal decision channel is read for the signal decisions made during the previous drum revolution. This data is coupled to AND gate 326. Since the other leg of AND gate 326 is held at "one" by the output of flip-flop 320 the signal decisions are read out from the signal decision channel 315. These signal decisions are again associated with the drum clock, not shown, for range indexing. Since a decision has been reached at all range bins those not indicating a signal decision are, of course, noise.

The analog-to-digital converter 201 or 101 may operate in a conventional sense, i.e., uniformly spaced quantizing levels, as usually employed in this type of operation. Since the bit size in practice must be finite, the output of the analog-to-digital converter is not distributed the same as the input. However, the input distribution can be taken as an approximation to the output distribution for all practical purposes. The exact number of bits required in the conversion can be determined by analysis and practical considerations. Usually, no more than 3-bits, 8 regions or 7 quantization levels, are sufficient and little is gained by using more.

Whenever very few quantization levels are used, less than 7, non-uniform distribution of quantization levels can be used. A special case is that of binomial sequential detector as set forth in co-pending application Serial No. 144,518, filed October 11, 1961, now U.S. Patent 3,171,119, where one quantization level at a mid-point of the range of input voltages, an optimum quantization level may be derived. In that case the sequential detector operations are based on the binomial distribution rather than the underlying distribution. If several non-uniformly spaced quantization levels are used than the operation of the log probability computer is based on the multinomial distribution. In the binomial case note that $D_0$, the initial or starting term, and two other terms called $D_f$ and $D_s$ are generated. Note that $D_0$ is for the case where the signal decision comparator and the noise decision comparator levels are "one" and "zero" respectively. In that case the quantization level is not set uniformly, in the middle of input variations, but is chosen to minimize the decision time or detection time. If two quantization levels are used than terms $D_0$ for the initial, and terms $D_1$, $D_2$, and $D_3$ would be generated, that is, $z_i$ takes on exactly one of these last three values.

Parallel operation in the forced continuation mode as suggested by the FIG. 3 embodiment or simple parallel operation is possible since these modes do not depend upon the nature of the detector, i.e., binomial, general digital or analog. However, when magnetic drums, delay lines, or shift register devices are employed, time sharing techniques may be employed to advantage. This is illustrated in FIG. 2 where the magnetic drum is employed.

The present system sets forth a means for quantization at multiple levels, i.e., more than one level which results in more efficient detection than for the one level quantization for the binomial sequential detector previously set forth in the aforementioned co-pending application. That is, for a given miss-probability and false alarm probability the multi-level digital sequential detector is faster than the binomial sequential detector.

Obviously many modifications and variations of the present invention are possible in the light of the above teachings. It is therefore to be understood that within the scope of the appended claims the invention may be practiced otherwise than as specifically described.

What is claimed is:
1. A general digital sequential detector comprising;
   input means for receiving the output from a radar system receiver;
   converter means operatively coupled to said input means for converting an analog voltage to a digital form;
   computer means operatively connected to the output of said converter means for computing the logarithm of the probability ratio of the output of the converter means;
   accumulator means operatively coupled to the output of said computer means for computing and storing inputs;
   decision means operatively coupled to the output of said accumulator means for comparing the output of said accumulator means against a predetermined level;
   said decision means being operable to generate a pulse when the output of said accumulator means exceeds a predetermined level in said decision means.
2. A general digital sequential detector as set forth in claim 1 and further including;
   reset means operatively coupled to the output of said decision means and having an output;
   said output from said reset means being operatively coupled to said accumulator for resetting said accumulator upon said decision means having an output.
3. A general digital sequential detector as set forth in claim 1 wherein;
   said converter means comprises an analog to digital converter for converting an analog input to a digital output to the base 2.
4. A general digital sequential detector as set forth in claim 1 wherein;
   said converter means comprises an analog to digital converter for converting an analog input to a digital output to the base 10.
5. A general digital sequential detector as set forth in claim 1 wherein said computing means comprises a special purpose computer which computes the logarithm of the probability ratio of the output from the analog to digital converter.
6. A multilevel digital sequential detector as set forth in claim 1 wherein;
   said decision means comprises signal decision means and noise decision means;
   said signal decision means having a predetermined bound so that when the output from said accumulator means exceeds said predetermined bound an output results from said signal decision means;
   said noise decision means having a predetermined bound set so that when the output of said accumulator means exceeds said predetermined bound an output results from said noise decision means.

No references cited.

CHESTER L. JUSTUS, *Primary Examiner.*

RODNEY D. BENNETT, *Examiner.*